United States Patent Office 2,986,404
Patented May 30, 1961

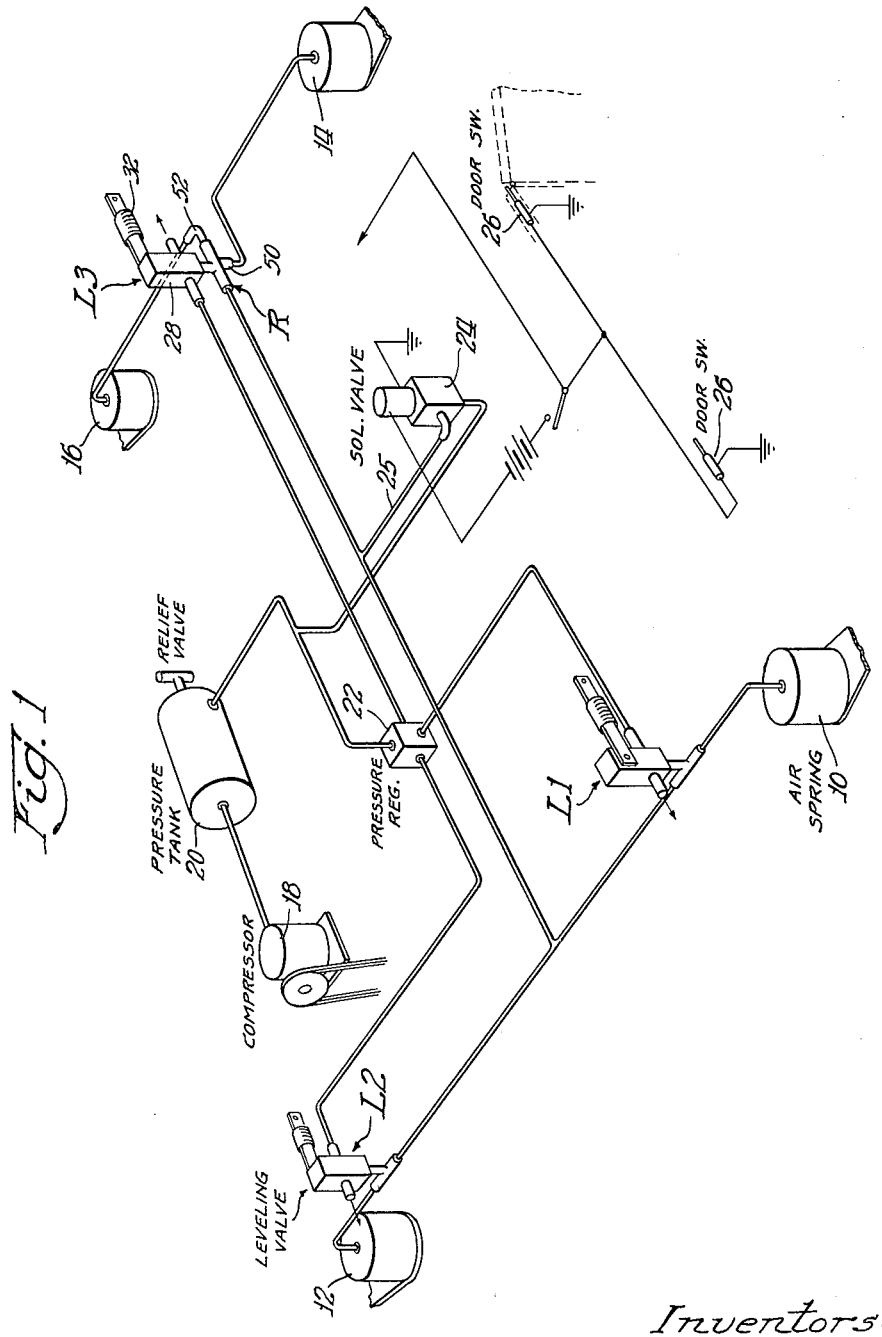

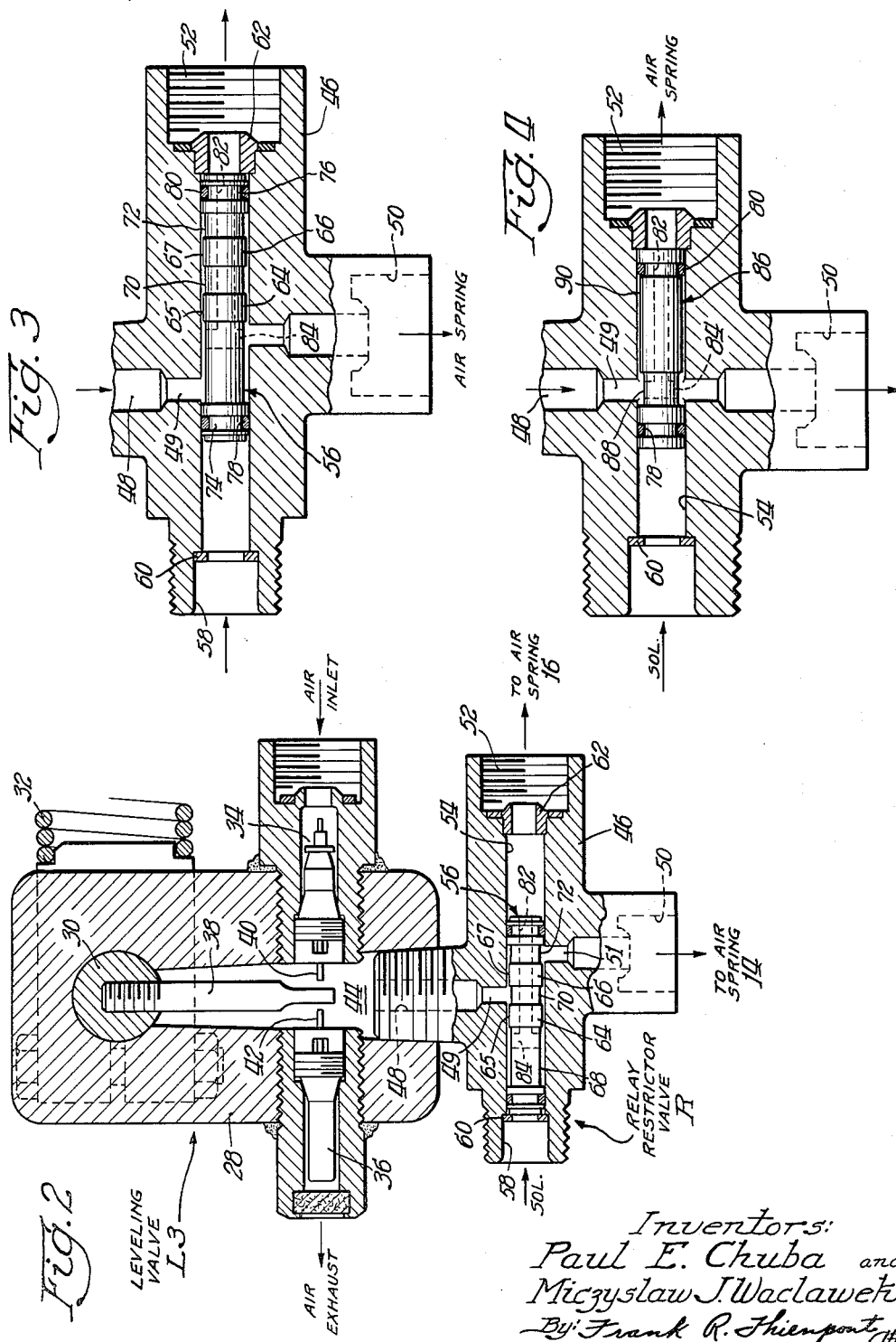

2,986,404
CONTROL VALVE FOR AIR SUSPENSION SYSTEM

Paul E. Chuba and Miczyslaw J. Waclawek, Chicago, Ill., assignors to Borg-Warner Corporation, Chicago, Ill., a corporation of Illinois Filed Oct. 2, 1958, Ser. No. 764,837
11 Claims. (Cl. 280—124)

This invention relates to control apparatus to control the fluid pressure in the fluid springs of a vehicle fluid suspension system and more particularly to a device for regulating the delivery of air to and discharge of air from fluid springs in such a system.

Usually air suspension systems on an automobile vehicle, for example, are designed with an air spring located near each of the four wheels so arranged as to support the vehicle body sometimes referred to as the sprung mass on the wheel and axle assembly sometimes referred to as the unsprung mass.

Incorporated into such an air suspension system are one or more control valves for controlling and regulating the admission of air from an air source to each of the springs as well as for exhausting air from the air springs when such action is required by various types of forces put on the vehicle. These forces may comprise, for example, shifting loads due to increase or decrease of passenger weight in the vehicle, acceleration and deceleration of the vehicle, forces produced on one side or the other of the vehicle when the vehicle turns so as to change the angular attitude of the vehicle body with respect to the wheel and axle assembly. These valves for controlling the admission and exhausting of air to and from the air springs may take various forms, a number of such forms being described in the pending applications of Richard L. Smirl, Serial No. 618,837 filed October 29, 1956, and Serial No. 743,558 filed June 23, 1958.

In some systems such as described in the above two mentioned pending applications one control valve is used to control the admission of air to and the discharge of air from two of the air springs such as for the two rear air springs, for example. Where only one valve is used for this purpose instead of having a control valve associated with each of the air springs, it has been found desirable to have apparatus for controlling the rate of transfer of air between the two rear air springs independently of the control valve governing the admission of air to and discharge of air from those same air springs. This becomes apparent, for example, in the case where the car rounds a curve or swings out to pass another vehicle or one side has a load put on it by passengers getting into the car on one side. Such forces, of course, cause compression of the air spring on the side on which force is applied and causes an expansion and decrease in pressure in the air spring on the opposite side. However, if a free communication exists between the two air springs there will immediately be a tendency toward equalization of pressure in the respective rear air springs. This tends to produce an even greater tilt leaving the sprung mass in a tilted condition with respect to the unsprung mass.

Accordingly, it is an object of this invention to provide a control valve for restricting the communication between two interconnected air springs of a vehicle such as the two rear air springs, for example, thus allowing only a restricted predetermined rate of flow of air between the two air springs during normal operation of the vehicle to counteract roll. More particularly it is an object of this invention to provide a control valve for this purpose wherein the restricting effect between the two air springs is accomplished by a predetermined circumferential restriction between the valve bore and a valve plunger of circular cross-section.

It is a further object of this invention to provide in this same control valve a means for allowing a free flow of air between two interconnected air springs if such flow is particularly desired.

It is still a further object of this invention to provide a control apparatus wherein a control valve providing for restricted flow as well as unrestricted flow under certain conditions is connected to a leveling valve mechanism so as to form an integral part thereof.

The invention consists of the novel constructions, arrangements, and devices to be hereinafter described and claimed for carrying out the above stated objects and such other objects, as will be apparent from the following description of preferred forms of the invention illustrated with reference to the accompanying drawings, wherein:

Fig. 1 is a diagrammatic representation of a dual rate of flow air suspension system;

Fig. 2 is a cross-sectional view of a leveling valve and a relay restrictor valve attached thereto with the restrictor valve in a slow-flow position;

Fig. 3 is an enlarged cross-sectional view of the relay restrictor valve shown in Fig. 2 with the valve shown in a fast flow position; and Fig. 4 is a cross-sectional view of a second embodiment of a relay restrictor valve the valve being shown in a fast flow position.

Like characters of reference designate like parts in the several views.

Referring now to Fig. 1 there is shown diagrammatically a dual rate of flow air suspension system for vehicles comprising two front air springs 10 and 12 and two rear air springs 14 and 16 which are normally attached to the body of a vehicle by suitable mechanical connections (not shown) and also by suitable mechanical connections (not shown) to a wheel and axle assembly of a vehicle. These air springs support the body of a vehicle, sometimes referred to as the sprung mass, on the wheel and axle assembly sometimes referred to as the unsprung mass.

This method of support is described in detail, for example, in the pending application of Richard L. Smirl, Serial No. 618,837, filed October 29, 1956, and since this forms no part of this invention further detailed explanation is unnecessary.

The air suspension system further comprises three leveling valve mechanisms L1, L2 and L3. The leveling valve mechanisms L1 and L2 are connected to and control the flow of air to and from the front air springs 10 and 12 respectively. The leveling valve mechanism L3 is connected to and controls the delivery of air to and discharge of air from the rear air springs 14 and 16. The leveling valve mechanisms of the type used herein are described in detail in the pending applications of Richard L. Smirl, Serial No. 618,837 filed October 29, 1956, and Serial No. 743,558 filed June 23, 1958.

The air suspension system further comprises an air compressor 18 of any suitable conventional construction having an air intake (not shown). The compressor 18 is driven by any suitable means such as from the vehicle engine by a fan belt. The compressor 18 discharges into a pressure tank 20. The pressure tank 20 supplies air to each of the air springs through a pressure regulator 22 which discharges to each of the leveling valves L1, L2 and L3. Pressure in the pressure tank 20 may be, for example, approximately 300 p.s.i. being reduced through the pressure regulator to approximately 150 p.s.i., for example, to be supplied to the air springs.

The air suspension system also comprises a solenoid actuated valve mechanism 24 connected with each of the leveling valve mechanisms L1, L2 and L3 by means of conduit 25. The solenoid valve mechanism 24 may be operated, for example, by door switches 26 so that when any door is opened the solenoid valve mechanism 24 is actuated from high pressure air to condition a relay restrictor valve assembly R (hereinafter described) for a fast flow condition.

This solenoid valve arrangement is used in what may be referred to as a double-rate of flow system such as described in the pending application of Richard L. Smirl, Serial No. 743,558, and herein diagrammatically illustrated in Fig. 1. Generally such a system provides for the admission of air to or exhausting of air from the air springs at two different rates depending on the leveling rate desired i.e., the rate at which it is desirable to correct an unbalanced condition of the vehicle body with respect to the wheel and axle assembly. The leveling valve mechanisms L1 and L2 are of the general type used in such a system and need not be described in detail.

The leveling valve mechanism L3 for the rear air springs 14 and 16 as shown clearly in Fig. 2, comprises a valve body 28 having a shaft 30 extending therethrough and rotatable therein. One end of a resilient spring arm 32 is attached to the shaft 30. The other end of the spring arm 32 is attached by suitable mechanical connections (not shown) to the wheel and axle assembly of the vehicle (not shown). Bending moments applied to the spring arm 32 rotate the shaft 30 to actuate the inlet or exhaust valves of the leveling valve mechanism as described below. The leveling valve mechanism L3 also comprises an air inlet valve 34 and an air exhaust valve 36 which may be conventional stem valves of the type used in tires. The inlet and exhaust valves 34 and 36 may be actuated by the lever 38 connected to the shaft 30 and swingable when the shaft 30 is rotated, the lever 38 actuating the valve stems 40 and 42 of the inlet and exhaust valves 34 and 36 respectively. Stems 40 and 42 extend into an air chamber 44 formed in the valve body 28.

The leveling valve mechanisms L1 and L2 may be similar in all respects to that portion of the leveling valve mechanism L3 thus far described.

The leveling valve mechanism L3 further comprises the relay restrictor valve assembly R and hereinafter sometimes referred to as the restrictor valve. A preferred embodiment of the relay restrictor valve assembly R is shown in Fig. 2 and in an expanded cross-section view in Fig. 3.

This preferred embodiment of the relay restrictor valve assembly R comprises a valve body 46 having an air inlet passage 48 suitably connected to the air chamber 44 of the valve body 28 such as by being screwed into the valve body 28, for example, as shown in Fig. 2. The inlet passage 48 has a narrowed portion 49 at the inner end thereof. The restrictor valve R also comprises two outlet passages 50 and 52 for connection respectively by suitable means to the rear air springs 14 and 16. The outlet passage 50 has a narrowed portion 51 at the inner end thereof. A bore 54 is formed in the valve body 46. The narrowed portion 49 of the passage 48 communicates with the bore 54. Slidably disposed in the bore 54 is a spool type valve plunger 56 having recessed undercuts on the periphery thereof as hereinafter more fully described. The bore 54 is formed so as to be in a direct line with the outlet passage 52 at one end of the valve body 46 and an opening 58 at the opposite end of the valve body 46. The opening 58 is adapted to be in communication with a solenoid controlled air pressure source. For example, the pressure tank 20 in the present instance. Two retainer rings 60 and 62 prevent the valve plunger from sliding out of the bore 54 through either the opening 58 or outlet passage 52 respectively.

The valve plunger 56 has formed thereon two lands 64 and 66 and circumferential recesses 68, 70 and 72. The lands 64 and 66 on the valve plunger 56 are so machined with respect to the bore 54 that predetermined clearances 65 and 67 exist between the lands 64 and 66 respectively and the bore 54. These predetermined clearances may be of the order of .0004–.0008 inch, for example. The amount of restriction of flow is also partially determined by the axial length of the lands 64 and 66. At each end of the valve plunger 56 there are formed two circumferential grooves 74 and 76 in which are mounted two O-sealing rings 78 and 80 respectively for preventing leakage of air in either direction past the O-rings. The valve plunger 56 has formed therein a longitudinal axial conduit 82 through a portion of its length intersected at the inner end thereof by a transverse passage 84.

When the valve plunger 56 is in its extreme left hand position as shown in Fig. 2 the recess 70 of the valve plunger 56 is in register with the narrowed portion 49 of the passage 48. When the valve plunger 56 is in its extreme right hand position as shown in Fig. 3 the recess 68 of the valve plunger 56 is in register with the narrowed portion 49 of the inlet passage 48 and the narrowed portion 51 of the outlet passage 50. When the valve plunger 56 is in its extreme right hand position free flow of air is permitted between the inlet passage 48 and each of the outlet passages 50 and 52 to each of the rear air springs 14 and 16 respectively or between the rear air springs 14 and 16 themselves independently of any action of the leveling valve tendency to admit air to or to exhaust air from the air springs. It will be noted that when the valve plunger 56 is in its extreme right hand position the longitudinal axial conduit 82 is so positioned with respect to the outlet passages 50 and 52 that free communication between the two air springs 14 and 16 therethrough is possible.

The predetermined clearances 65 and 67 restrict the flow of air from the chamber 44 of the valve body 28 through the inlet passage 48 to each of the air springs or vice versa when the valve plunger 56 is in its extreme left hand position as shown in Fig. 2. The clearances 65 and 67 also restrict the flow between the air springs 14 and 16 when the valve plunger is in its extreme left hand position.

A modified form of a relay restrictor valve assembly is shown in Fig. 4. It is similar in construction to the relay restrictor valve assembly shown in Figs. 2 and 3 with the exception that the valve plunger 86 is of a slightly different construction than the valve plunger 56. The valve plunger 86 has formed thereon a circumferential recess 88 intersected by the transverse passage 84. The longitudinal axial conduit 82 also extends from the right end of the valve plunger 86 to intersect the transverse passage 84. When the valve plunger 86 is in its extreme right hand position, the recess 88 and the transverse passage 84 are in registry with the narrowed portion 49 of the inlet passage 48 thus permitting free communication, that is, a free flow of air between the inlet passage 48 and the outlet passages 50 and 52. This extreme right hand position of the valve plunger 86 also permits free flow between the air springs 14 and 16 independently of any action of the leveling valve tendency to admit air to or exhaust air from them. When the valve plunger 86 is in its extreme left hand position that is with its left end against the retainer ring 60 the narrowed portion 49 of the inlet passage 48 is in registry with a predetermined clearance 90 between the valve plunger 86 and the bore 54. Thus a predetermined clearance 90 between the bore 54 and the valve plunger 86 will allow only a restricted flow of air between the passage 48 of the valve body 28 and each of the air springs 14 and 16. Furthermore, the clearance 90 also provides a restricted means of communication between the two air springs 14 and 16, that is, air passing between the air springs 14 and 16 must pass through the longitudinal conduit 82 and the clearance 90.

Referring now to the operation of the relay restrictor valve assembly R (see Figs. 2 and 3) it is pointed out that it serves two functions which are as follows:

(1) A relay valve for permitting either fast or slow filling or exhausting of air springs 14 and 16 such fast or slow flow being controlled by the position of the valve plunger 56.

(2) A restrictor valve for restricting flow between the two air springs 14 and 16 thus increasing resistance to roll of the vehicle body.

For fast or unrestricted flow a solenoid valve actuated air source actuated by the valve mechanism 24 acts on the left end of the valve plunger 56 to position the valve plunger 56 as shown in Fig. 3. If the leveling valve mechanism is filling the air springs, that is, when the air inlet valve 34 is opened, air will enter the passage 48 and flow through the recess 68 and outlet passage 50 to air spring 14 and also through conduit 82 to the air spring 16. On the other hand if the leveling valve is exhausting, that is the valve 36 being actuated by a bending moment having been applied to spring arm 32 and lever 38, a reverse flow will take place from the air springs 14 and 16 through the exhaust valve 36. If the leveling valve is in a neutral position, that is, air is neither being admitted nor exhausted, then a free flow of air between the air springs 14 and 16 will be possible through the conduit 82 and the passage 84.

For a slow or restricted flow the solenoid valve mechanism 24 will not be actuated so that the opening 58 of the restrictor valve will be vented to the atmosphere. In this condition the back pressure of the air spring 16 will force the valve plunger 56 to its extreme left hand position as shown in Fig. 2. In this condition the restrictor valve R is conditioned for slow flow if the leveling valve mechanism is filling, that is, the air inlet valve 34 is opened, then air will flow through the passages 48 and 49 into the recess 70, through the clearance or restriction 65, into the transverse passage 84 and the longitudinal conduit 82 and into the air spring 16. Air will also flow through the restriction 67 into the recess 72, through the portion 51 and out to the air spring 14. If the leveling valve mechanism L3 is exhausting, a reverse flow from the air springs 14 and 16 will take place through the same passages and recesses. If the leveling valve is in a neutral position, that is, neither filling nor exhausting a restricted flow of air between the air springs 14 and 16 may still take place. For example, if air is forced from 14 to 16 due to roll of the vehicle in a turn, for example, the air will flow between the passages 50 and 51 through recess 72, through the restrictions or clearances 67 and 65 and into the transverse passage 84, the conduit 82 and then to the air spring 16. It will be noted that the lands 64 and 66 are of substantially equal length, that the clearance between each of them and the bore 54 is substantially the same, and that substantially an equal restriction of flow is provided to each of the air springs from the inlet or from the air springs to the exhaust. It will also be noted that since restricted interchange of air between the two air springs 14 and 16 must pass through both of the restrictions 65 and 67 that the restriction of interchange of air between the air springs is substantially twice as great as the restriction provided in filling or exhausting either of the air springs.

Referring now to the operation of the embodiment of the relay restrictor valve assembly shown in Fig. 4 it is pointed out that it serves the same two functions as the embodiment R illustrated in Figs. 2 and 3 as set out above. It operates in the same manner as R in that the valve plunger 86 assumes an extreme left hand position against the retainer 60 for restricted flow and an extreme right hand position as illustrated in Fig. 4 for unrestricted flow therethrough. For slow or restricted flow the solenoid valve mechanism 24 is not actuated so that there is no air pressure against the left end of the valve plunger 86 thus allowing back pressure from the air spring 16 to move the valve plunger 86 to its extreme left hand position. In that condition if the leveling valve mechanism is filling then air will flow through the passages 48 and 49 into the clearance 90 between the valve plunger 86 and the bore 54, into the transverse passage 84 and through the longitudinal conduit 82 into the air spring 16. Air will also flow around the valve plunger 86, in the clearance 90 and out through the passage 50 to the air spring 14. If the leveling valve mechanism is exhausting reverse flow will take place from each of the air springs through passages 48 and 49 and thence to the chamber 44 and out through the exhaust valve 36. If the leveling valve mechanism is in a neutral position, that is, neither filling nor exhausting, a restricted flow of air between the air springs 14 and 16 may still take place through the clearance 90, the transverse passage 84 and the longitudinal conduit 82. This condition may occur due to roll of the vehicle in a turn, for example. The restriction or clearance 90 will prevent a rapid transfer of air from one air spring to the other under those circumstances.

Thus it will be seen that the restriction provided by the spool type valve plungers in the relay restrictor valve assemblies advantageously restricts the flow of air between the two rear air springs to counteract roll of the vehicle when, for example, the vehicle negotiates a curve or swings out to pass another vehicle.

This invention also advantageously provides an integral control valve mechanism serving the dual functions of providing for both a fast and slow flow of air as well as providing for a restricted flow of air between two air springs adapted to be connected thereto.

We wish it to be understood that this invention is not to be limited to the specific constructions and arrangements shown and described, except only insofar as the claims may be so limited, as it will be apparent to those skilled in the art that changes may be made without departing from the principle of the invention.

We claim:

1. In a vehicle air suspension system a control valve for regulating air flow between air springs comprising: a valve body having an inlet passage and two outlet passages formed therein, said inlet passage adapted to be connected to an air source and said outlet passages each adapted to be connected to an air spring; means defining a bore in said valve body in communication with said inlet and said outlet passages; a spool-type plunger valve reciprocably mounted in said bore; means defining a circumferential restriction between said bore and said plunger valve so as to restrict the flow of air between said inlet and each of said outlet passages and between said outlet passages individually, said restriction defining means comprising a first land on said valve positioned on one side of said inlet passage for restricting flow of air to one of said outlet passages and a second land positioned on the other side of said inlet passage for restricting the flow of air to said second outlet passage said first and second lands on said valve further acting as a restriction to the flow of air between said outlet passages when said last named passages are connected with air springs.

2. The control valve of claim 1 wherein the respective restrictions between the inlet passage and each of said outlet passages are substantially equal.

3. In a vehicle air suspension system a control valve for regulating air flow between air springs comprising: a valve body having two passages formed therein each adapted to be connected to an air spring; means defining a bore in communication with said two passages; a spool-type plunger valve reciprocably mounted in said bore; means defining a circumferential restriction between said bore and said plunger valve; means defining a conduit in said plunger valve in communication with said restriction means and each of said passages; said restriction means restricting the flow of air between said two passages.

4. In a vehicle air suspension system a control valve for regulating air flow between air springs comprising: a valve body having first and second external passages formed therein each adapted to be connected to an air spring and a third external passage formed therein adapted to be connected to an air source; means defining a bore in communication with each of said passages; the ends of said bore means being in communication with said first and third passages and said second passage forming a lateral intersection with said bore means; a spool-type plunger valve reciprocably mounted in said bore; means defining a longitudinal conduit in said plunger valve, one end of said conduit means being in communication with said first external passage; means defining a transverse passage in said plunger valve in communication with the other end of said conduit means; means defining a circumferential restriction between said bore and said plunger valve, said restriction means being in communication with said transverse passage means and forming a restricted air flow path between said first and second external passages.

5. In a vehicle air suspension system a control valve for regulating air flow between air springs comprising: a valve body having an inlet passage and two outlet passages formed therein, said inlet passage adapted to be connected to an air source and said outlet passage each adapted to be connected to an air spring; means defining a bore in said valve body in communication with said inlet and said outlet passages; a spool-type plunger valve reciprocably mounted in said bore; means defining a conduit in said plunger valve, one end thereof being in communication with one of said outlet passages; means defining a restriction between said bore and said plunger valve said restriction means comprising first and second lands on said plunger valve, said first land in operable condition restricting air flow between said inlet passage and one of said outlet passages, said second land in operable condition restricting air flow between said inlet passage and the other of said outlet passages, and both first and second lands in operable condition restricting air flow between said outlet passages when air springs are connected thereto.

6. In a vehicle air suspension system a control valve for regulating air flow between air springs comprising: a valve body having an inlet passage and two outlet passages formed therein, said inlet passage adapted to be connected to an air source and said outlet passages each adapted to be connected to an air spring; means defining a bore in said valve body in communication with said inlet and said outlet passages; a spool-type plunger valve reciprocably mounted in said bore; means defining a circumferential restriction between said bore and said plunger valve so as to restrict the flow of air between said inlet and each of said outlet passages and between said outlet passages individually when said plunger valve is in a first position, means defining a conduit in said plunger effective to allow unrestricted flow of air between said inlet and each of said outlet passages and between said outlet passages individually when said plunger valve is in a second position.

7. In a vehicle air suspension system a control valve for regulating air flow between air springs comprising: a valve body having an inlet passage and two outlet passages formed therein, said inlet passage adapted to be connected to an air source and said outlet passages each adapted to be connected to an air spring; means defining a bore in said valve body in communication with said inlet and said outlet passages; a spool-type plunger valve reciprocably mounted in said bore; means defining a circumferential restriction between said bore and said plunger valve so as to restrict the flow of air between said inlet and each of said outlet passages and between said outlet passages individually, said restriction means being defined by a clearance between said bore and said plunger valve extending over the circumference of a portion of the length of said plunger valve and the restriction means between the air springs being greater than the restriction means between either of the air springs and the inlet passage.

8. In a vehicle air suspension system the combination comprising: two air springs; a control valve for regulating air flow between said air springs comprising, a valve body having an inlet passage and two outlet passages formed therein, said inlet passage adapted to be connected to an air source and said outlet passages each connected to one of said air springs; means defining a bore in said valve body in communication with said inlet and said outlet passages; a spool-type plunger valve reciprocably mounted in said bore; means defining a circumferential restriction between said bore and said plunger valve so as to restrict the flow of air between said inlet and each of said outlet passages and between said outlet passages individually, said restriction means being formed by lands on said spool-type slidable plunger valve coacting with said bore.

9. In a vehicle air suspension system the combination comprising: two air springs; a leveling valve mechanism for controlling the flow of air to and from said air springs and comprising a first valve body, inlet and exhaust valves mounted in said first valve body, means defining a chamber in said first valve body in communication with said inlet and exhaust valves, a second valve body having an inlet passage and two outlet passages formed therein, said inlet passage being connected to said chamber means and said outlet passages being connected to said two air springs respectively; means defining a bore in said second valve body in communication with said inlet and said outlet passages, a spool-type plunger valve reciprocably mounted in said bore, means defining a circumferential restriction between said bore and said plunger valve so as to restrict the flow of air between said chamber means of said first valve body and each of said air springs, said restriction means being further effective to restrict the flow of air between each of said air springs, the restriction means between said chamber means and an air spring being less than the restriction means between the air springs.

10. In a vehicle air suspension system the combination comprising: two air springs; a leveling valve mechanism for controlling the flow of air to and from said air springs and comprising a first valve body, inlet and exhaust valves mounted in said first valve body, means defining a chamber in said first valve body in communication with said inlet and exhaust valves, a second valve body having an inlet passage and two outlet passages formed therein, said inlet passage being connected to said chamber means and said outlet passages being connected to said two air springs respectively; means defining a bore in said second valve body in communication with said inlet and said outlet passages, a spool-type plunger valve reciprocably mounted in said bore, means defining a circumferential restriction between said bore and said plunger valve so as to restrict the flow of air between said chamber means of said first valve body and each of said air springs, said restriction means being further effective to restrict the flow of air between each of said air springs, the restriction means comprising a first and second portion, said first portion restricting flow between said chamber means and one air spring and said second portion restricting flow between said chamber means and another air spring.

11. In a vehicle air suspension system the combination comprising: two air springs; a leveling valve mechanism for controlling the flow of air to and from said air springs and comprising a first valve body, inlet and exhaust valves mounted in said first valve body, means defining a chamber in said first valve body in communication with said inlet and exhaust valves, a second valve body having an inlet passage and two outlet passages formed therein, said inlet passage being connected to said chamber means and said outlet passages being connected to said two air springs respectively; means defining a bore in said second valve body in communication with said inlet and said outlet passages, a spool-type plunger valve reciprocably mounted in said bore, means defining a circumferential restriction between said bore and said plunger valve so as to restrict the flow of air between said chamber means of said first valve body and each of said air springs, said restriction means being further effective to restrict the flow of air between each of said air springs, the restriction means between the chamber means of said first valve body and one of said air springs being substantially one-half that of the restriction between the two air springs.

References Cited in the file of this patent

UNITED STATES PATENTS 2,787,475   Jackson ----------------- Apr. 2, 1957

OTHER REFERENCES

SAE Journal Publication, February 1958, pp. 50 and 59.